(12) United States Patent
Nimura et al.

(10) Patent No.: US 6,202,026 B1
(45) Date of Patent: *Mar. 13, 2001

(54) MAP DISPLAY DEVICE AND A RECORDING MEDIUM

(75) Inventors: Mitsuhiro Nimura; Hiroyoshi Masuda, both of Anjo (JP)

(73) Assignee: Aisin AW Co., Ltd., Anjo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,249

(22) Filed: Jul. 29, 1998

(30) Foreign Application Priority Data

Aug. 7, 1997 (JP) .................................................. 9-212799

(51) Int. Cl.[7] .............................. G09R 29/00; G01C 21/00
(52) U.S. Cl. .......................... 701/211; 340/995; 701/212
(58) Field of Search ................................... 701/208, 209, 701/211, 212, 201; 340/995

(56) References Cited

U.S. PATENT DOCUMENTS

| | | | |
|---|---|---|---|
| 5,283,562 | * 2/1994 | Kaneko et al. | 345/131 |
| 5,884,217 | * 3/1999 | Koyanagi | 701/208 |
| 5,925,091 | * 7/1999 | Ando | 701/212 |
| 5,936,631 | * 8/1999 | Yano et al. | 345/428 |

FOREIGN PATENT DOCUMENTS

| | | |
|---|---|---|
| 335390 | 11/1992 | (JP) . |
| 270172 | 10/1995 | (JP) . |
| 20259 | 1/1996 | (JP) . |

* cited by examiner

Primary Examiner—Michael J. Zanelli
(74) Attorney, Agent, or Firm—Oliff & Berridge, PLC

(57) ABSTRACT

A map display device for a vehicle navigation system providing route guidance including an information memory device for storing map data relating to route search and route guidance, as well as other guidance data, an input device for inputting instructions and information for route search and route guidances, a display device for displaying a map and other guidance data by switching between a single screen display mode and a two-part split screen display modes, and a display control device for reading guidance data from the information memory device in response to the instructions input to the input device and a control guidance screen displayed on the display device. The map display device displays a frame, to the position corresponding to the detailed map, on the wide area map, regarding the wide area map and its detailed map in the two-part split screen display mode. Therefore, this system can distinctly display the relationship between the detailed map and the wide area map displayed in two-part split screen display mode.

8 Claims, 15 Drawing Sheets

FIG. 2A
GUIDANCE ROAD DATA

| NUMBER OF ROADS (n) | |
|---|---|
| 1 | ROAD NUMBER |
| | LENGTH |
| | ROAD ATTRIBUTE DATA |
| | ADDRESS AND SIZE OF SHAPE DATA |
| | ADDRESS AND SIZE OF GUIDANCE DATA |
| | ⋮ |
| n | |

FIG. 2B
SHAPE DATA

| NUMBER OF NODES (m) | |
|---|---|
| 1 | EASTERN LONGITUDE |
| | NORTHERN LATITUDE |
| ⋮ | |
| m | |

FIG. 2C
GUIDANCE DATA

| INTERSECTION NAME |
|---|
| TRAFFIC SIGNAL DATA |
| LANDMARK DATA |
| PRECAUTION DATA |
| ROAD NAME DATA |
| ROAD NAME VOICE DATA |
| ADDRESS AND SIZE OF DESTINATION DATA |

FIG. 2D
DESTINATION DATA

| NUMBER OF DESTINATIONS (k) | |
|---|---|
| 1 | DESTINATION ROAD NUMBER |
| | DESTINATION NAME |
| | ADDRESS AND SIZE OF DESTINATION NAME VOICE DATA |
| | DESTINATION DIRECTION DATA |
| | DRIVING GUIDANCE DATA |
| | ⋮ |
| k | |

FIG. 2E
DESTINATION DIRECTION DATA

-1 : INVALIDITY
0 : NOT NECESSARY
1 : STRAIGHT AHEAD
2 : RIGHTWARD DIRECTION
3 : DIAGONALLY RIGHTWARD DIRECTION
4 : DIRECTION TO RETURN TO RIGHT
5 : LEFTWARD DIRECTION
6 : DIAGONALLY LEFTWARD DIRECTION
7 : DIRECTION TO RETURN TO LEFT

ROAD ATTRIBUTE DATA

| OVERPASS/ UNDERPASS DATA | OVERPASS | |
|---|---|---|
| | ROAD ALONGSIDE OVERPASS | ○ |
| | UNDERPASS | |
| | ROAD ALONGSIDE UNDERPASS | |
| NUMBER OF LANES | 3 LANES OR MORE | |
| | 2 LANES | ○ |
| | ONE LANES | |
| | NO CENTER LINE | |
| CITY AREA/SUBURBS | CITY AREA ROAD | ○ |
| | SUBURBS ROAD | |

FIG. 3A

ROAD NAME DATA

| ROAD TYPE | IN-TYPE NUMBER |
|---|---|

| EXPRESS-WAY | MAIN LINE | 1 |
|---|---|---|
| | ANCILLARY ROAD | 2 |
| MUNICIPAL EXPRESS-WAY | MAIN LINE | 3 |
| | ANCILLARY ROAD | 4 |
| TOLL ROAD | MAIN LINE | 5 |
| | ANCILLARY ROAD | 6 |
| GENERAL ROAD { NATIONAL ROAD | | 7 |
| PREFECTURAL ROAD | | 8 |
| OTHERS | | 9 |

FIG. 3B

PRECAUTION DATA

| RAILROAD CROSSING | ○ |
|---|---|
| TUNNEL ENTRANCE | |
| TUNNEL EXIT | |
| ROAD WITH REDUCED POINT | |
| NO INFORMATION | |

FIG. 3C

DRIVING GUIDANCE DATA

| BEAR RIGHT | |
|---|---|
| BEAR LEFT | |
| BEAR TOWARD CENTER | ○ |
| NO INFORMATION | . |

FIG. 3D

FIG. 5A
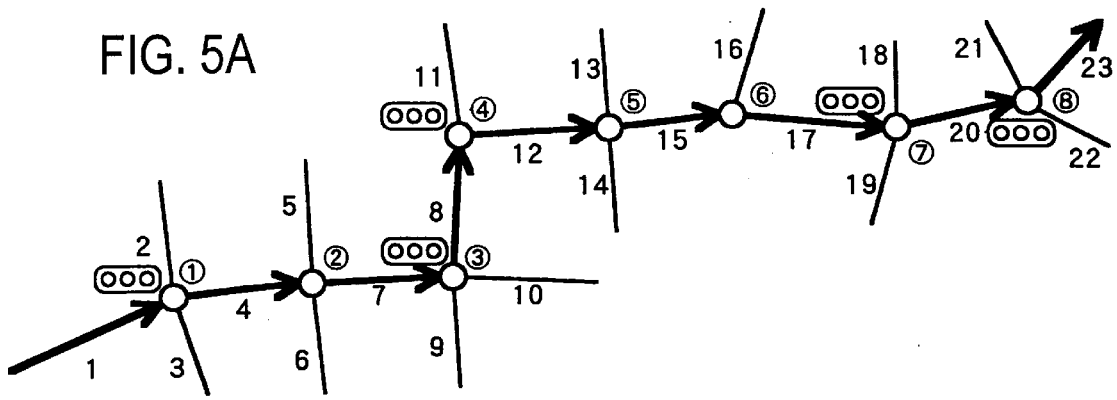
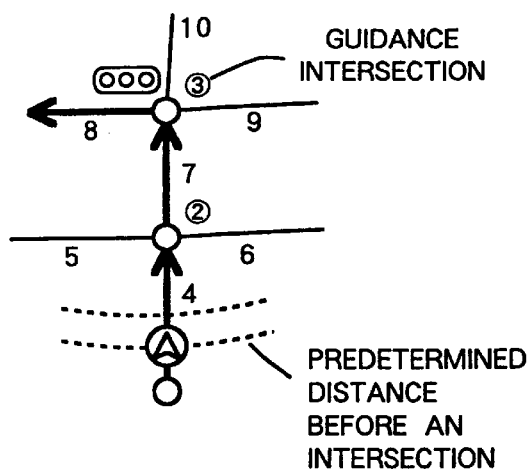
FIG. 5B
GUIDANCE ROAD NUMBER DATA
| NUMBER OF GUIDANCE ROADS(n) |
| --- |
| 1 |
| 4 |
| 7 |
| 8 |
| 12 |
| ⋮ |
| |
| |
FIG. 5C

MAP DISPLAY DEVICE AND A RECORDING MEDIUM

BACKGROUND OF THE INVENTION

1. Field of Invention

This invention relates to a map display device and a recording medium of a vehicle navigation system which searches for a route from a departing point or a present position to a destination, and executes route guidance in accordance with the searched route.

2. Description of Related Art

There are various types of vehicle navigation systems for providing a driver with guidance information along a vehicle travel route, such as a navigation system that searches for a route to a destination and provides visual/audio guidance on characteristic information relating to a map and route information to the destination, and a navigation system that displays a map centering the present position and providing information about the vicinity of the present position, etc. For example, regarding a vehicle navigation system having functions, such as route search and route guidance, there are proposed systems, such as a system for simultaneously providing the positional relationship between the destination and the present position and the detailed information on the vicinity of the present position of the vehicle, by displaying a wide-area map including the area from the present position to the destination and the detailed map of the present position on the two-part split screen (e.g. Japanese Patent Publication No. 335390/92), a system for identifying the relative position in the wide-area map by displaying a scaled-down map on a sub-window through the use of a main window and a sub-window (e.g. Japanese Patent Publication No. 270172/95), and a system for displaying a window frame matching the enlarged scale on the map and then magnifying a road map within the frame when the system displays a magnified map (Japanese Patent Publication No. 20259/96).

According to the above-mentioned system which displays a wide-area map and a detailed map on the two-part split screen, the system fixes the wide-area map screen and alters the position and the direction of the present position mark, whereas, regarding the detailed map screen, the system fixes the display position of the present position mark in the center of the map and then scrolls the map. Therefore, the above-mentioned system makes it difficult for the driver to identify which display area of the wide-area map corresponds to the continuous variable display area of the detailed map. Regarding the system displaying a sub-window, the sub-window superimposed on the main window makes the driver difficult to see because a part of the map displayed on the main window is covered by the sub-window. Regarding the system displaying a window frame for displaying a magnified map on the un-magnified map, since the wide-area map is erased after being magnified, its relative position in the wide area cannot be identified.

SUMMARY OF THE INVENTION

One aspect of the invention is to display the correspondences between the detailed map and the wide-area map clearly in the two-part split display mode.

In order to attain the above aspect, there is provided a map display device, comprising an information memory device for storing map data and other guidance data, an input device for inputting instructions and information relating to the map display, a display device for displaying a wide-area map and a detailed map respectively on a two-part split screen, and a display control device for reading map data and guidance data from the information memory device in response to the instructions input by the input device and controlling guidance information displayed on the display device. The display control device displays a frame around the position on the wide-area map that corresponds to the detailed map displayed on the two-part split screen.

According to another aspect of the invention, the display control device scrolls a frame displayed on the wide-area map as the detailed map scrolls in accordance with the scroll operation, and scrolls the area displayed on the wide-area map when the frame extends off said wide-area map during the scroll operation, scrolls the area displayed on the wide-area map so that the frame lies in the center of the wide-area map, or the frame doesn't lie off the area displayed on the wide-area map and changes the size of the frame to scale in accordance with the area displayed on the detailed map.

The display control device having a virtual travel mode displays a present position mark on said detailed map by using said virtual travel mode, scrolls said detailed map in accordance with a searched route, scrolls the frame displayed on said wide-area map corresponding to said scroll of the detailed map, and scrolls said wide-area map so that said frame does not extend off the area displayed on said wide-area map as said frame scrolls.

BRIEF DESCRIPTION OF THE DRAWINGS

The invention will be described with reference to the following drawings in which:

FIGS. 2A–2E are diagrams showing an example of the structure of such as guidance road data, etc.;

FIGS. 3A–3D are diagrams showing an example of the structure of such as such as road attribution data, etc.;

FIG. 5A–5C are diagrams for describing a route set by route search shown in FIG. 4;

DETAILED DESCRIPTION OF PREFERRED EMBODIMENTS

One embodiment of the invention will be described below with reference to the drawings.

Figure 1:
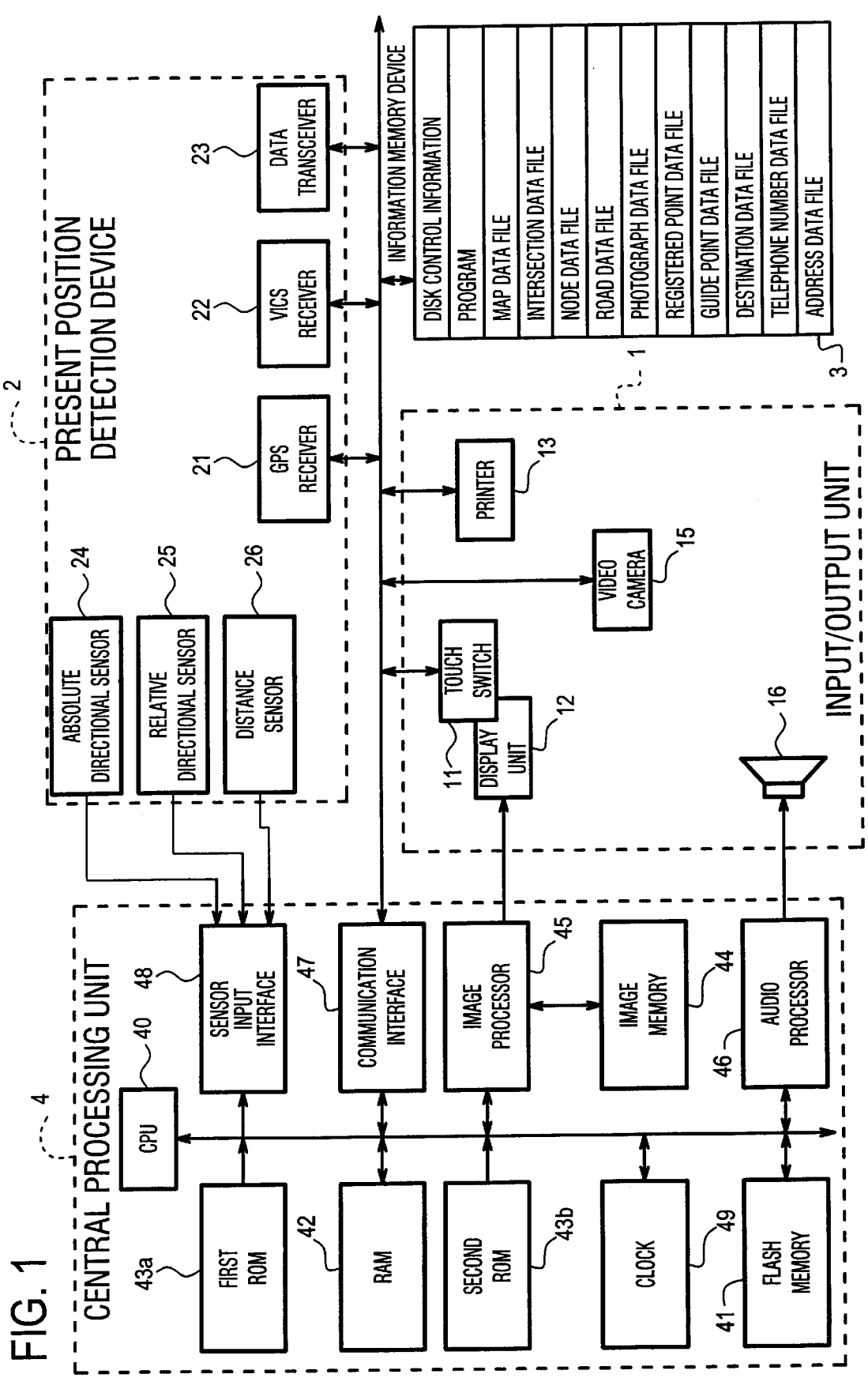
FIG. 1 is a diagram showing one embodiment of the vehicle navigation system according to the present invention.

FIG. 1 is a diagram showing one embodiment of a vehicle navigation system according to the invention. FIG. 2 is a diagram showing the road guidance data structure, etc. FIG. 3 is a diagram showing the road attribution data structure, etc.

A vehicle navigation system according to the invention comprises an input/output unit 1 for inputting/outputting information relating to route guidance, and selection and execution of various functions; a present position detection device (present position detection means) 2 for detecting information relating to the present position of a vehicle; an information memory device (information recording means) 3 in which navigation data necessary for route calculation, and visual/audio guidance data necessary for route guidance and the application and/or OS program, etc. have been stored, and a central processing unit 4 for executing audio/visual guidance processing necessary for route search processing and route guidance, and control for the overall system. The following is the description of the respective structures.

The input/output unit 1 functions to enter destinations, to allow the driver to instruct the central processing unit 4, at the volition of the driver, to execute navigation processing in such a manner that guidance information can be output by voice and/or a screen display when required by the driver, and to print out processed data. As a means for implementing these functions, the input section of the input/output unit 1 has a touch switch 11 and operation switch for entering a destination in the form of a telephone number or coordinates on a map, and for requesting route guidance. It is also possible to use the input device as a remote control or other similar input device, as an alternative of the touch switch 11 and operation switch, or use them together, as a matter of course. Further, the input section comprises a video camera 15 for recording scenery from the forward direction of the vehicle. The output section has a display (display output means) 12 for displaying input data on a screen, moreover, for automatically displaying route guidance on the screen in response to a request from the driver, a printer 13 for printing out data processed by the central processing unit 4 and data stored in the information memory device 3, and a speaker (audio output means) 16 for outputting route guidance by voice.

It is possible to add a voice recognition unit for enabling voice input and/or a record card reader for reading data recorded on an IC or magnetic card. It is also possible to add a data communication device for exchanging data between an information source, such as a personal computer in which driver's own data, e.g. map data, destination data, etc., has previously been stored.

The display 12 comprises a color CRT or color liquid-crystal display device. On the basis of map data and guidance data processed by the central processing unit 4, the display 12 outputs as a color display, all screens necessary for navigation, such as a route setting screen, a screen for intersections, etc. The display 12 also displays buttons for setting route guidance, changing guidance screens during the route instruction, and invoking selection menus of various functions. In particular, transit-intersection information such as the names of the intersections to be traversed is displayed in color in the forms of a pop-up menu on the interval view screen when required.

The display 12 is provided inside the instrument panel in the vicinity of the driver's seat. Observing the displayed map enables the driver to ascertain the present location of the vehicle and to obtain information regarding a route from this location. Further, the display 12 is provided with a touch switch 11 that corresponds to the display of function buttons. The operations described above are executed based upon signals entered by the touching the buttons. An input signal generating means unit comprising the buttons and touch switch constructs the input section, though a detailed description thereof is omitted.

The present position detection device 2 detects or receives information on the present position of the vehicle. The present position detection device 2 comprises an absolute directional sensor 24 comprising a geomagnetic sensor, etc., a relative directional sensor 25 utilizing a steering sensor, or a gyro sensor, etc., a velocity sensor 26 for detecting travel distance from the number of revolutions of a wheel, a GPS receiver 21 which utilizes a global positioning system (GPS), and a communication device. The communication device comprises a VICS information receiver 22 which is traffic information receiving device and a data transceiver 23. The VICS (Vehicle Information & Communication System) transmits traffic information to the vehicle in real time utilizing an FM multiplex signal (multiplexed text broadcasting), radio beacon, and optical beacon, for example. The FM multiplex signal transmits rough information to a wide area. The radio beacon and optical beacon transmit detailed information in a confined area of approximately 10-km radius from beacons and the vehicle receives said information as passing by the beacon. The VICS transmission data comprises the degree of traffic congestion (e.g., no passage, congested, crowded, dense traffic, regular traffic), the position and length of traffic congestion, traffic control (road construction information, no passage, etc.), and the length of travel time (required time at the predetermined speed) corresponding to the link numbers of the respective roads. Further, the data transceiver 23, such as a cellular phone or a personal computer, communicates information required for navigation guidance bi-directionally with the traffic information center when required by a driver.

The information memory device 3 is an external storage device for storing the navigation programs and data in external storage medium, such as a CDROM (hereinafter referred to as CD), DVD (Digital Video Disc), optical CD, IC Card, etc. The program comprises a map drawing section, a route search section, a route guidance section, a present position calculation section, and a destination setting operation control section, etc. Further, the program comprises an application section and an OS (operating system) section for executing signal processing of the navigation system for processing a route search, a display output control required for route display guidance, a program for executing audio output control necessary for audio guidance and data required for the program, and also display information data necessary for route guidance and map display. The data contains the record of all data necessary for the navigation system, such as map data, intersection data, road data, and various guidance data.

The navigation programs include a program (route search means) for setting a destination and a way (or passing) point on the basis of positional information from a present position detection device 2 and signals input from the input device 11, and performing route search by using search road data, a program for executing route search again by converting search road data on the basis of traffic information obtained from the communication device, a program (route information conversion means) for converting the searched route so that the searched route can be displayed in the form of 3D images, a program for determining audio output timing and audio phrases pursuant to the map drawing, matching and route, and a program for identifying characteristics from images captured through a video camera 15 (image photographing means), determining the relative moving direction of identified characteristics on the display, and determining a travel route based on the moving direction. The respective functions of the navigation system according to the invention are performed by activating the programs stored in information recording device 3. In the embodiment of the invention, the programs for performing the functions of the present invention are stored in the information memory device 3 which is an external recording medium.

All of the programs or a part of the programs, and all the data or a part of the data for performing the functions of the invention can be received through a data transceiver 23 from the information center or other vehicles and stored in a flash memory 41 or RAM 42.

A central processing unit 4 comprises a CPU 40 for performing various calculation processing, and a flash memory 41 for reading and storing a program from a CD installed in information memory device 3. The flash memory 41 can be rewritten by erasing the stored program when a program stored in a CD is changed. The central processing unit 4 comprises a first ROM 43a for storing a program (program reading means) which executes program check and update processing of a flash memory 41, RAM 42 for temporarily storing searched route guidance information, such as a position coordinate of a set destination, road code number, etc. and data under calculation processing, and a second ROM 43b for storing display information data required for route guidance and map display. The program for performing update processing can be stored in an external storage device.

Further, the central processing unit 4 comprises an image memory 44 in which image data for display on the screen is stored; an image processor 45 which, on the basis of a display control signal from the CPU 40, extracts image data from the image memory 44 and delivers the data to the display unit upon subjecting to image processing; an audio processor 46 which, on the basis of an audio-output control signal from the CPU 40, combines audio, phrases, single sentences and sounds, etc. read out of the RAM 42, converts the result to an analog signal and delivers the analog signal to the speaker 16; a communication interface 47 for performing an exchange of input/output data by the communicating device; a sensor-input interface 48 for accepting a sensor signal from the present-position detecting device 2; and a clock 49 for entering the date and time into internal dialog information.

A photographed image is converted from analog signals to digital signals through the CPU 40, and recorded into RAM 42. From this image data, landmarks, such as intersections and turning points are identified and image identification processing is executed. In this image identification processing, landmarks are identified by referring to image data file color and feature information stored in the information memory device 3.

In this central processing unit 4, the CPU 40 adopts data obtained from the respective sensors of the present position detection system 2 through the sensor input interface 48, and calculates present position coordinates at established periods and temporarily stores the coordinates in RAM 42. These present position coordinates result from map matching in consideration of detection error of various data. Correction of output values from various sensors is constantly performed. Route guidance is performed through both screen display and audio output and a driver can select route navigation with or without audio output.

A program required for route navigation can be stored in advance in ROM 43a of central processing system 4 or in information memory device (recording medium) 3. If the program is stored in the information memory device 3, the program is renewed and the renewed program is executed when the system reads the program from information memory device 3 and stores the read program in a flash memory 41. The navigation system can be operated by temporarily storing the read program from information memory device 3 in RAM 42.

FIGS. 2A–2E and 3A–3D illustrate exemplary structures of main data files stored in the information memory device 3. A guidance road data file, as shown in FIG. 2A, comprises, for each of n roads, a road number, length, road attribution data, shape date address and size, and guidance data address and size, and is stored in the form of the data necessary for providing route guidance based on a route search executed by a route search section.

The road number is set, according to the direction (outbound or inbound) for each road section between intersections. The road attribution data is road guidance supplemental information data and, as shown in FIG. 3A, is composed of data, such as whether the road is an overpass, a road alongside an overpass, an underpass or a road alongside an underpass, the number of the lanes, and whether the road is in the city or in the suburbs. The shape data, as shown in FIG. 2B, has coordinate data which when each road is divided into a plurality of nodes, comprises east longitude and north latitude for each of m nodes. The guidance data, as shown FIG. 2C, comprises data such as intersection (branch point) names, traffic light data, landmark data, precaution data, road name data, road name voice data, address and size of course data.

In the collection of the guidance data, the precaution data, as shown in FIG. 3C, indicates information on whether there is a railroad crossing, a tunnel entrance or exit, a point of reduced road width, or that no information exist (i.e. normal road conditions exist). The data is to warn the driver the presence of conditions where caution should be exercised, such as a railroad crossing or a tunnel except for intersections and branch points. The road name data, as shown in FIG. 3B, indicates information on the road category, such as a highway, city highway, toll road, and ordinary road (national road, prefectural road, etc.), and whether the highway, city highway or tall road is a main road or a junction. This data is composed of road classification data and classification numbers, namely individual number data for each road classification. The destination data, as shown in FIG. 2D, comprises the road number and names of destinations, the address and size of the destination name voice data, destination direction data, and travel guidance data.

In the collection of the destination data, the destination direction data as shown in FIG. 2E, indicates information such as invalidity (meaning that the destination direction data is not used), disuse (guidance is not given), straight ahead, right direction, slight right direction, sharp right direction, left direction, slight left direction, sharp left direction. The travel guidance data, as shown FIG. 3D, stores data for instructing the driver which lane to take when there are a plurality of lanes, or to enable the driver to select among right, left, and center, or do nothing.

Figure 4:
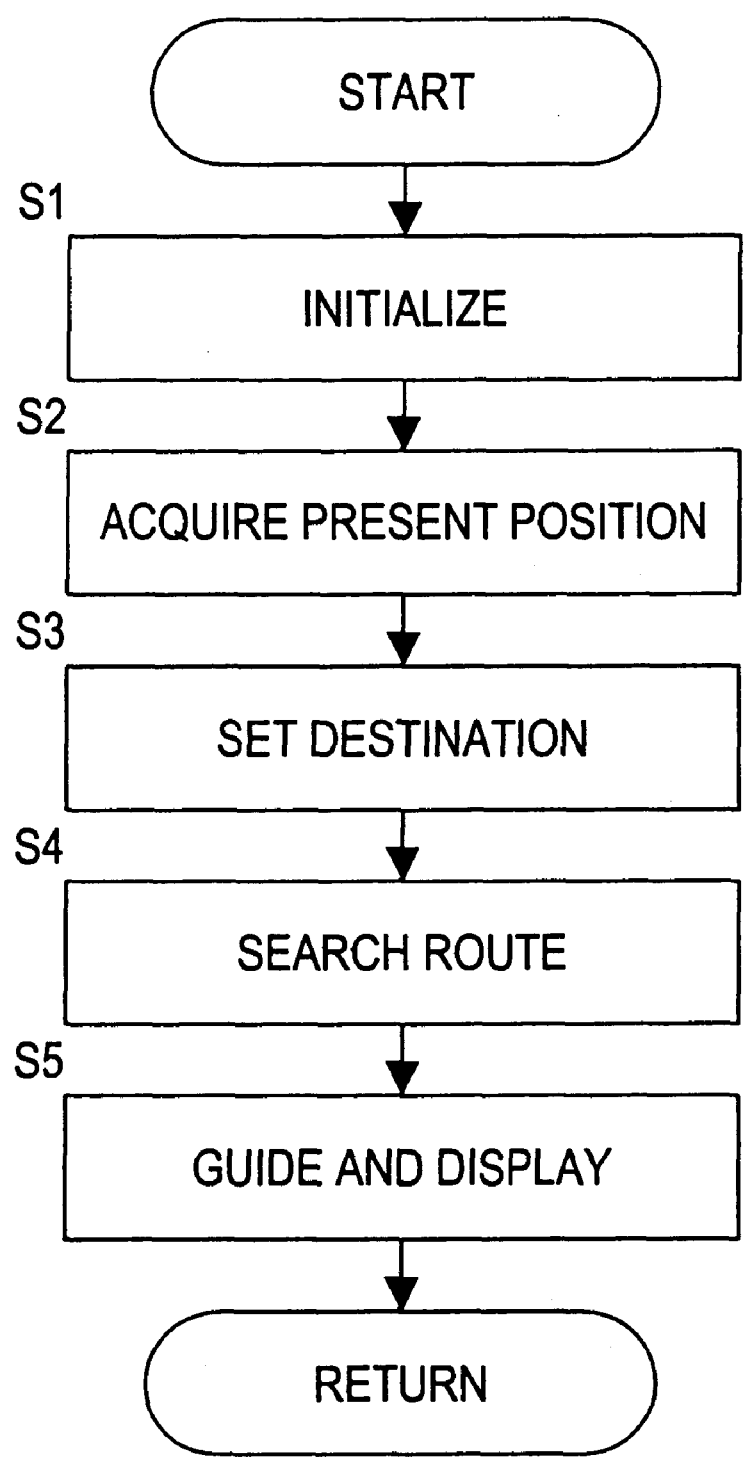
FIG. 4 is a flowchart describing the processing flow of the overall system of the vehicle navigation system according to the invention.

FIG. 4 is a flowchart describing the process of the overall navigation system according to the invention. FIGS. 5A–5C are diagrams for explaining the route set by route search executed in FIG. 4. As shown in FIG. 4, a CPU 40 comprising a central processing unit 4, reads a navigation program from a CD-ROM after executing initialization processing. The read program is stored in a flash memory 41 and activated (step S1), and the navigation system then detects a present position by using a present position detection device 2, displays a map of the vicinity of the present position including the name of the present position, etc. (step S2). Next, the navigation system sets a destination by using telephone number, address, facility name, and registered location, etc. (step S3), and executes a route search from the present position to the destination (step S4). As a result of this route search, the route to the destination is set as guidance road number data so that the road number to be guided is arranged numerically, as shown in FIG. 5A–5C. When the route is determined, the navigation system repeatedly performs display and/or audio output processing of route guidance until the vehicle reaches the destination by keeping track of the present position through the present position detection device 2 (step S5).

Figure 6:
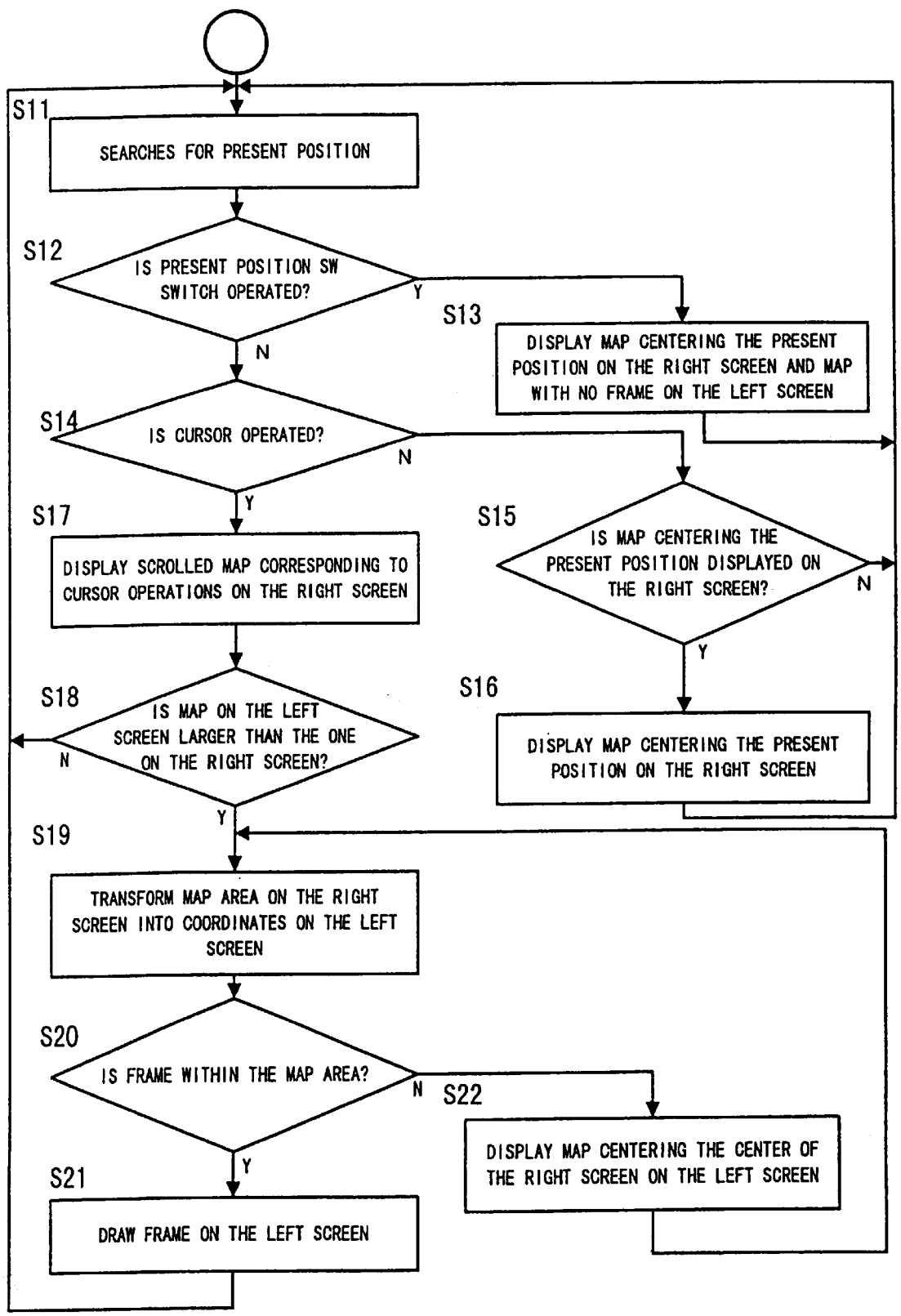
FIG. 6 is a flowchart describing an example of the display processing in two-part split screen display mode.

The invention enables a driver to clearly identify the correspondences between two screens in the two-part split display mode when one of the screens is scrolled, by switching the screen of display 12 between a single screen and the two-part split screen in the course of the present position detection processing in step S2, destination setting processing in step S3 and route guidance display processing in step S5. FIG. 6 is a diagram describing one of the examples of display processing in the two-part split display mode.

In the two-part split screen display mode, the system displays a map centering the present position on one of the screens, and a building shape map including a route map and a city area map, or information relating to a destination, passing points or other functions, on the other screen, in order that information from the present position map and other information can be obtained simultaneously. Further, regarding the position detection, displaying a detailed map (a magnified map) on one of the screens and a wide-area map on the other screen enables the driver to obtain position information in a wide area and detailed information in the vicinity of the position, and use the system for various other purposes.

In the two-part split display mode, for example, as shown in FIG. 6, the system searches for the present position (step S11) and determines whether the present position switch SW is operated (step S12). When the present position switch SW is operated, the system displays a map centering the present position on the right screen and a map without a frame on the left screen (step S13), and returns to step S11. This is because a vehicle navigation system can display a map centering the present position with a single keystroke of the present position switch SW without scrolling operations, etc., in response to display commands of the present position.

In case where the present position switch SW is not operated, the system determines whether cursor operations are executed (step S14). When the cursor operations are not executed, the system determines whether the map centering the present position is displayed on the right screen (step S15), and returns to step S11 when the map centering the present position is not displayed. When the map centering the present position is displayed on the right screen, the system maintains the map on the right screen (step S16) and returns to step S11. When cursor operations are executed in step S14, the system displays a map which is scrolled by the cursor operations on the right screen (step S17) and determines whether the map on the left screen covers wider area (a small-scale map) than the map on the right screen (step S18). This means that the cursor operations are executed on the right screen and the system determines whether the two-part split display mode displaying the detailed map and the wide area map, respectively, is executed. When the map on the left screen is not wider (a small-scale map) than the one of the right screen, the system determines that the left screen does not directly relate to the right screen, but is being used for other purposes, maintains this condition, and returns to step S11. When the map shown on the left screen is wider than the one on the right screen, the map area on the right screen is transformed into the coordinates of the map displayed on the left screen (step S19). Then the system determines whether the frame designated by the coordinates is within the map area displayed on the left screen (step S20). When the frame is within the map area on the left screen, the system draws the frame on the left screen (step S21), and when the frame extends off the map area on the left screen, the system switches the map displayed on the left screen into a map centering a center position of the right screen, and returns to step S19.

Figure 7:
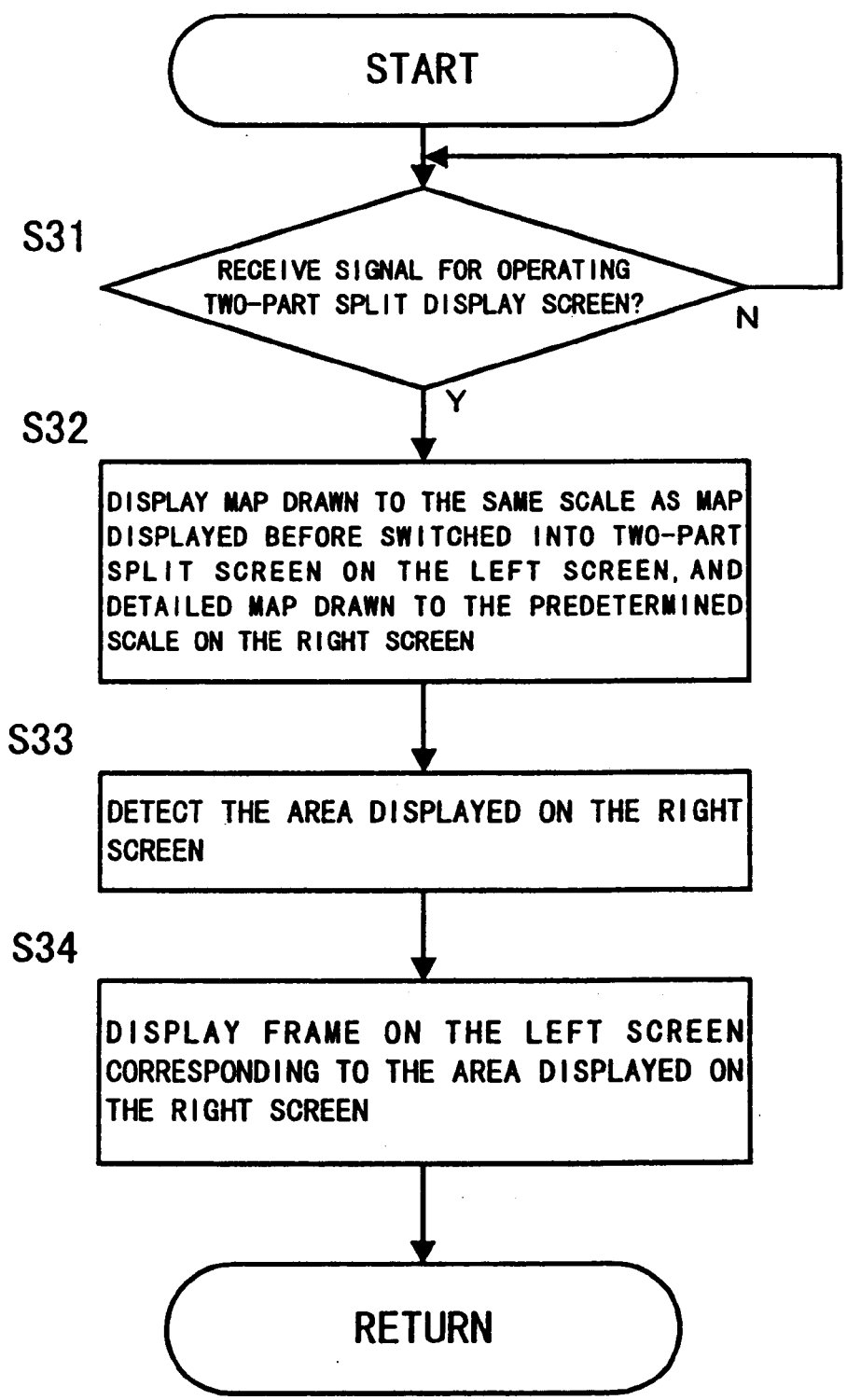
FIG. 7 is a flowchart for describing an example of switching processing of the two-part split screen display.
Figure 8A:
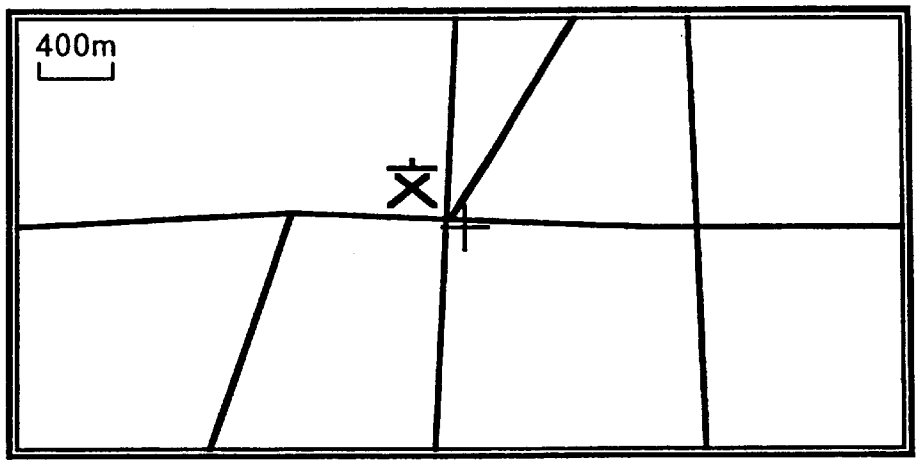
FIGS. 8A and 8B arc diagrams for describing an example of transition between the single screen and the two-part split screen.
Figure 8B:
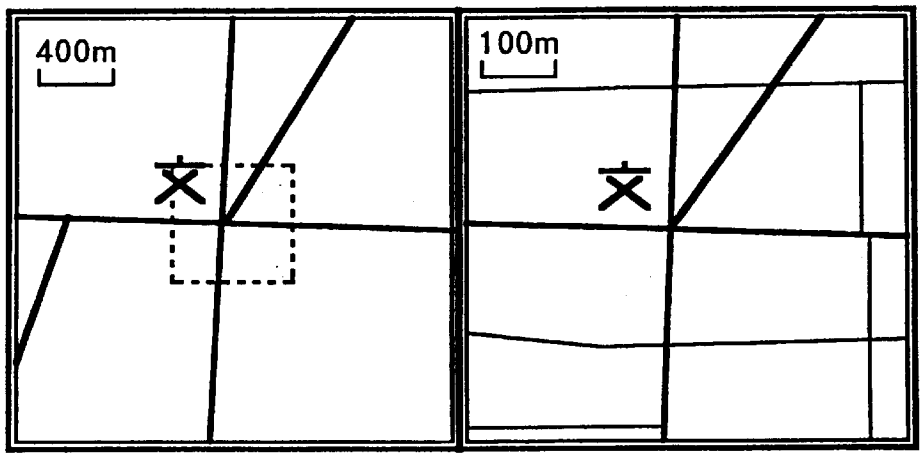
Figure 9:
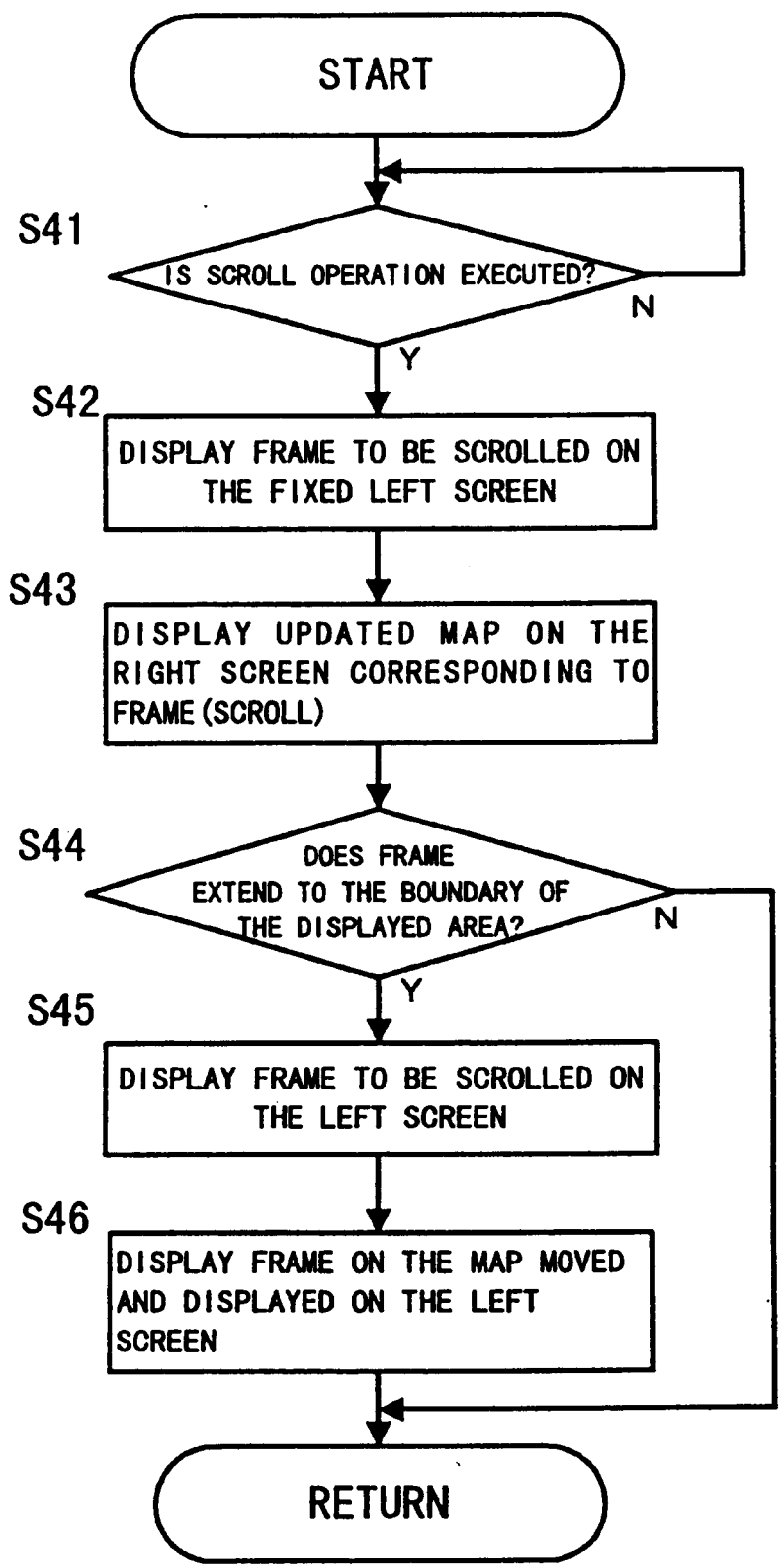
FIG. 9 is a flowchart for describing an example of display processing by scroll operations.
Figure 10A:
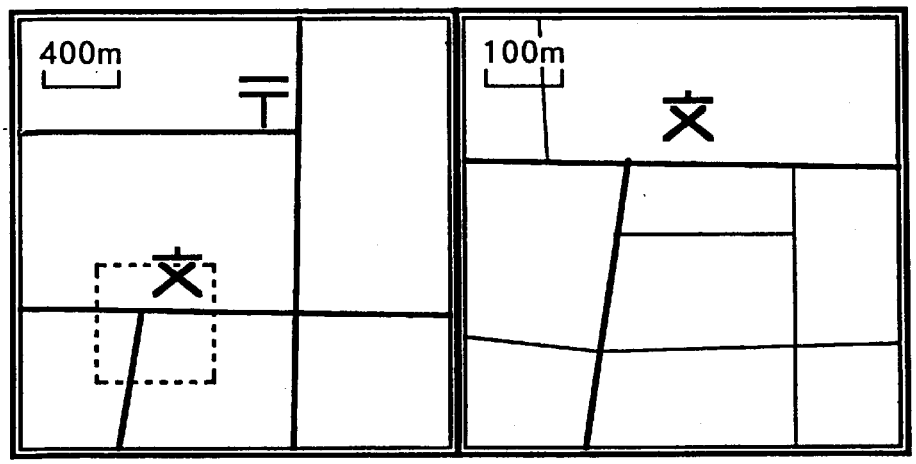
FIGS. 10A–10C is a diagram for describing examples of scroll screen.
Figure 10B:
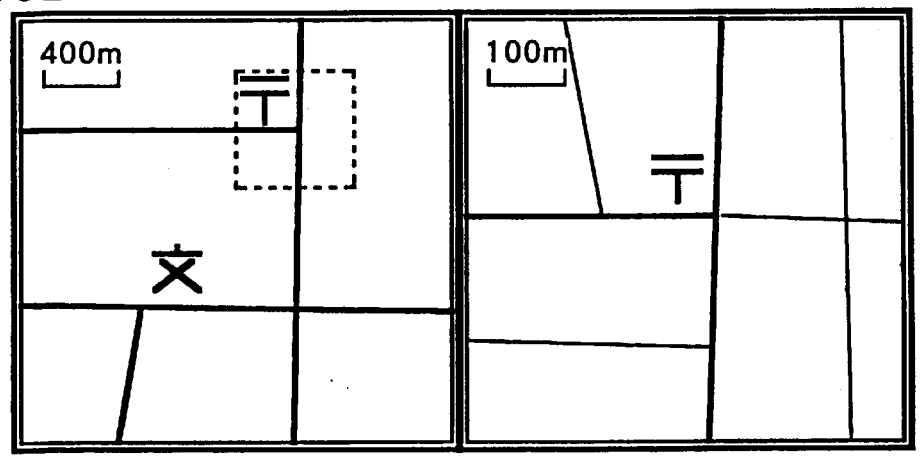
Figure 10C:
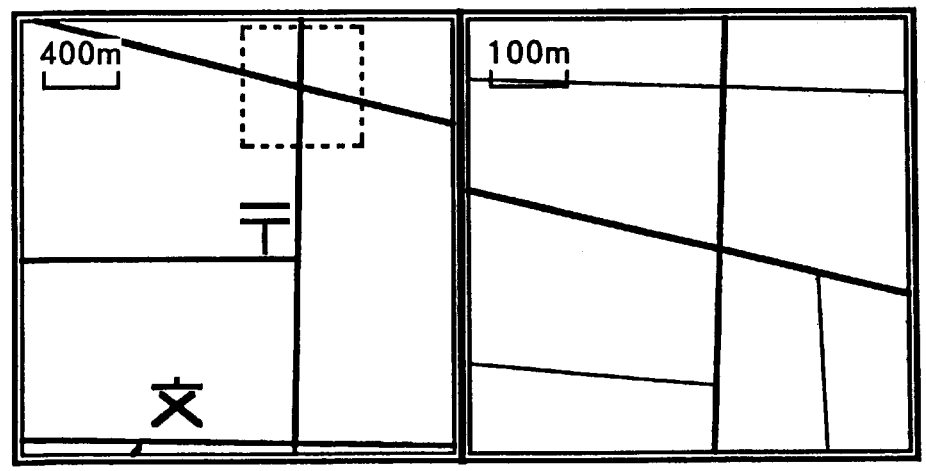
Figure 11:
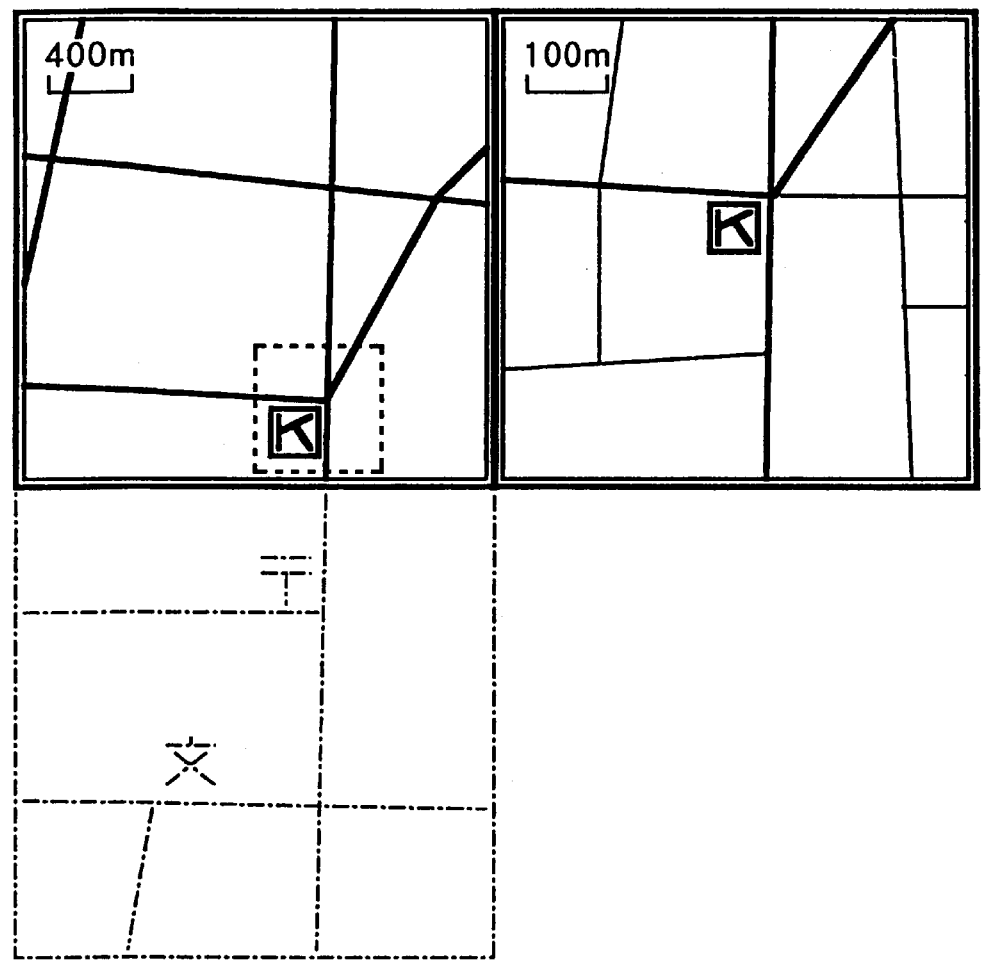
FIG. 11 is a diagram showing an example of switching a screen by scrolling.
Figure 12A:
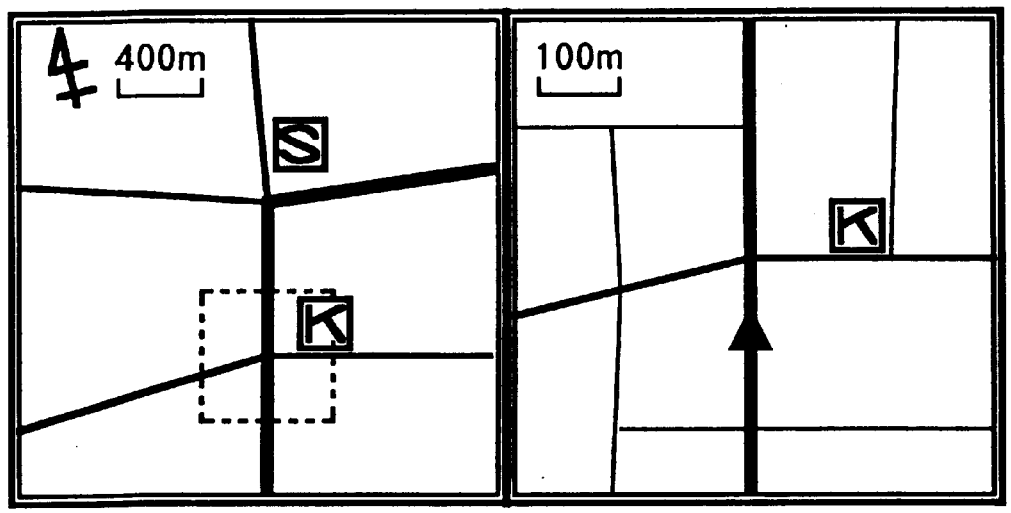
FIGS. 12A–12B are diagrams showing an example of a screen corresponding to the change of the map direction.
Figure 12B:
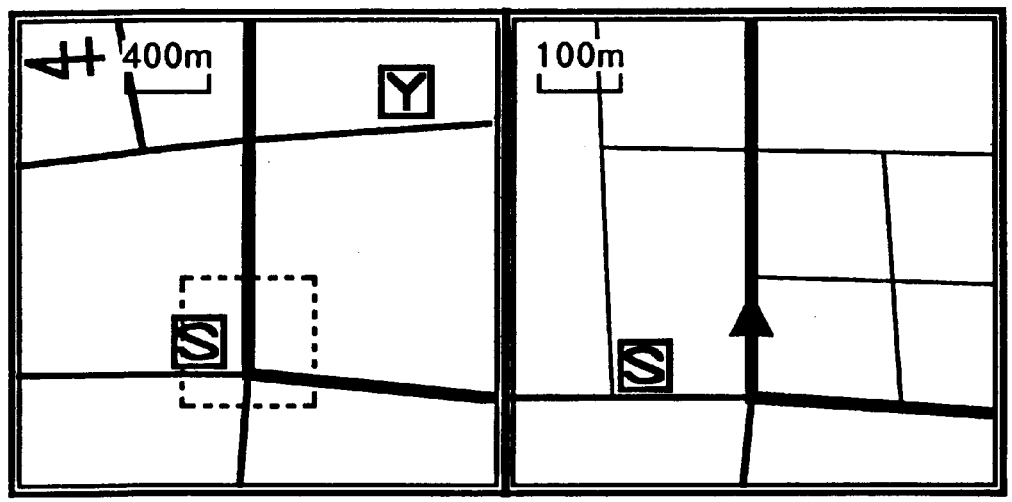
Figure 13:
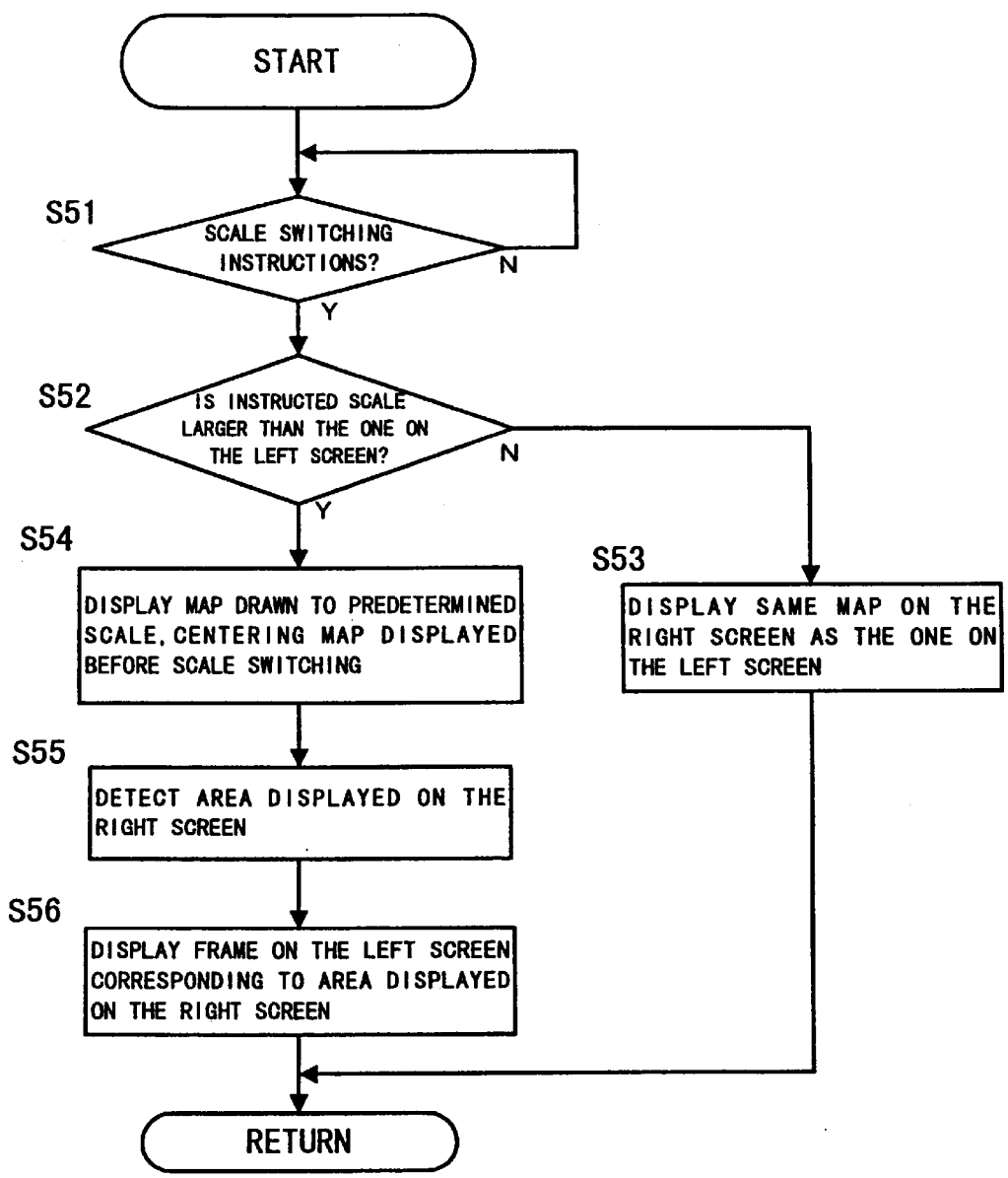
FIG. 13 is a flowchart for describing an example of the scale switching process.
Figure 14A:
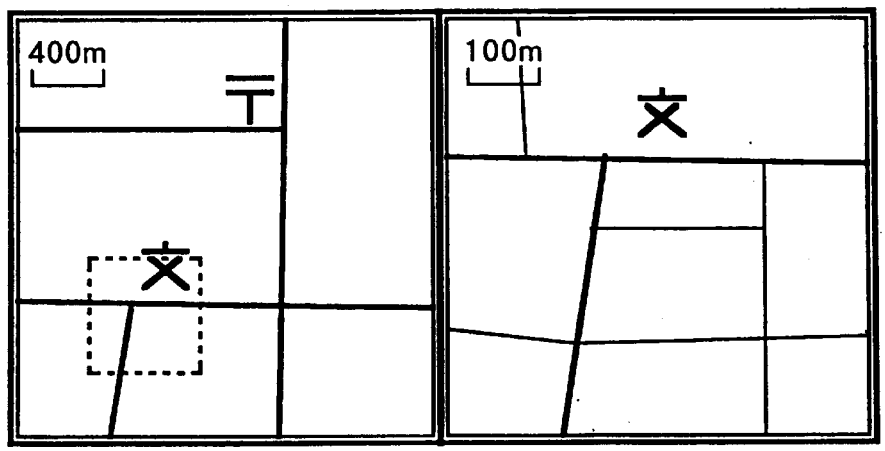
FIGS. 14A–14C are diagrams for showing examples of the scale switching screen.
Figure 14B:
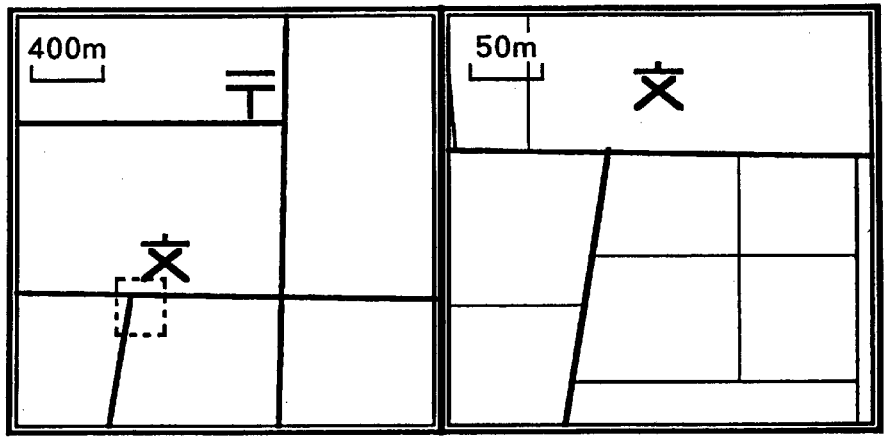
Figure 14C:
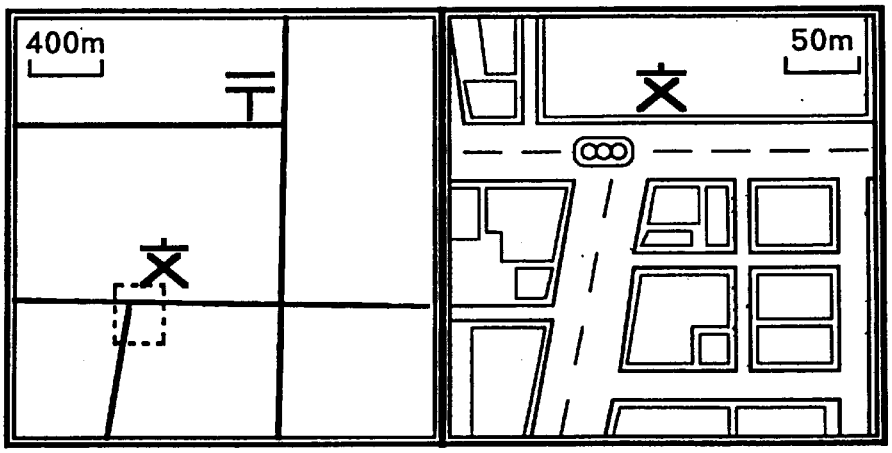

FIG. 7 is a flowchart describing an example of the switching processing of the two-part split screen display. FIGS. 8A and 8B are drawings describing an example of screen transition between a single screen and a two-part split display screen. FIG. 9 is a flowchart describing an example of display processing by scroll operations. FIGS. 10A–10C illustrate examples of scrolled screens. FIG. 11 illustrates an example of switching the screen by scroll operation. FIGS. 12A and 12B illustrate examples of screens corresponding to the change of the map direction. FIG. 13 is a flowchart describing an example of scale switching processing. FIGS. 14A–14C illustrate examples of scale switching screens.

In two-part split display screen mode, as shown in FIG. 7, the system stands by until receiving a two-part split screen operation signal (step S31). Then, as shown in FIG. 8A, the system displays a map of same scale which centers the map displayed prior to switching into two-part split screen, as shown in FIG. 8B, and displays a detailed map to a predetermined scale on the right screen (step S32). Then the system detects the area displayed on the right screen (step S33), and displays a frame which indicates the area displayed on the right screen by the dotted lines as shown in FIG. 8B (step S34).

Regarding display processing by scroll operations on two-part split display screen, as shown in FIG. 9, the system detects a scrolling operation (step S41). When the scrolling operation is detected, as shown in FIGS. 10A and 10B, the system displays a frame on the fixed left screen by scrolling (step S42), and displays an updated map on the right screen corresponding to the frame (scroll) (step S43). Then the system determines whether the frame reaches to the area displayed on the left screen (step S44). When the frame reaches to the border line of the area displayed on the left screen, as shown in FIG. 10C, the system displays a wide area map on the left screen that is to be scrolled so that the frame can not extend off the area displayed on the left screen (step S45) and displays the frame on the wide area map that is scrolled and displayed on the left screen (step S46).

When the frame reaches to the border line of the area displayed on the left screen in step S44, the system, as shown in FIG. 11, may switch the map displayed on the left screen into its annexed map, instead of scrolling the left screen corresponding to the scroll operation, as shown in FIG. 10C. Further, in the mode which constantly displays the direction to which the vehicle is heading, in an upward direction, the map rotates as the vehicle turns the direction at a intersection. In this case, also, as shown in FIGS. 12A and 12B, the left screen rotates in correspondence with the right screen and displays a frame. Such a display is useful for the driver to obtain rough and detailed information to design a route because the wide area map and the detailed map are displayed in parallel by a simulation mode scrolling a map as if the present position mark is traveling along the searched route. Thus, this virtual travel mode, is useful both during and after searching for a route.

Regarding the scale switching process in the two-part split screen display mode, as shown in FIG. 13, the system detects whether scale switching instructions are performed (step S51), determines whether the instructed scale is larger than the scale of the left screen when scale switching instructions are provided (step S52). When the instructed scale is larger than the scale on the left screen, on the right screen, the system displays a map, in which the scale is the same as the one on the left screen (step S53) and when the instructed scale is not larger than the scale on the left screen, the system displays a map on the right screen drawn to the instructed scale by fixing the center of the map screen displayed before changing the scale (step S54). Then the system detects the area displayed on the right screen (step S55) and displays a frame on the left screen corresponding to the area displayed on the right screen, as shown in FIGS. 14A–14C by the dotted lines (step S56). In this embodiment, the system arranges the screen so that the map on the right screen does not become larger than the one of the left screen, and on the other hand, the map on the left screen does not become smaller than the one of the right screen.

Figure 15A:
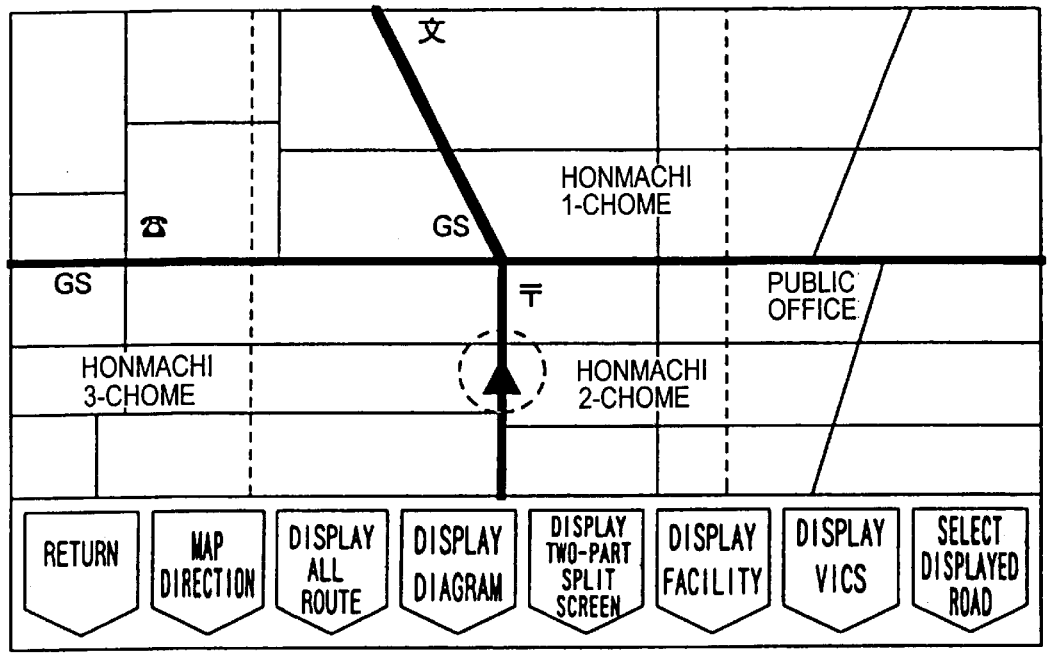
FIGS. 15A and 15B are diagrams showing a further example of the transition screen between the single screen display mode and the two-part split screen display mode.
Figure 15B:
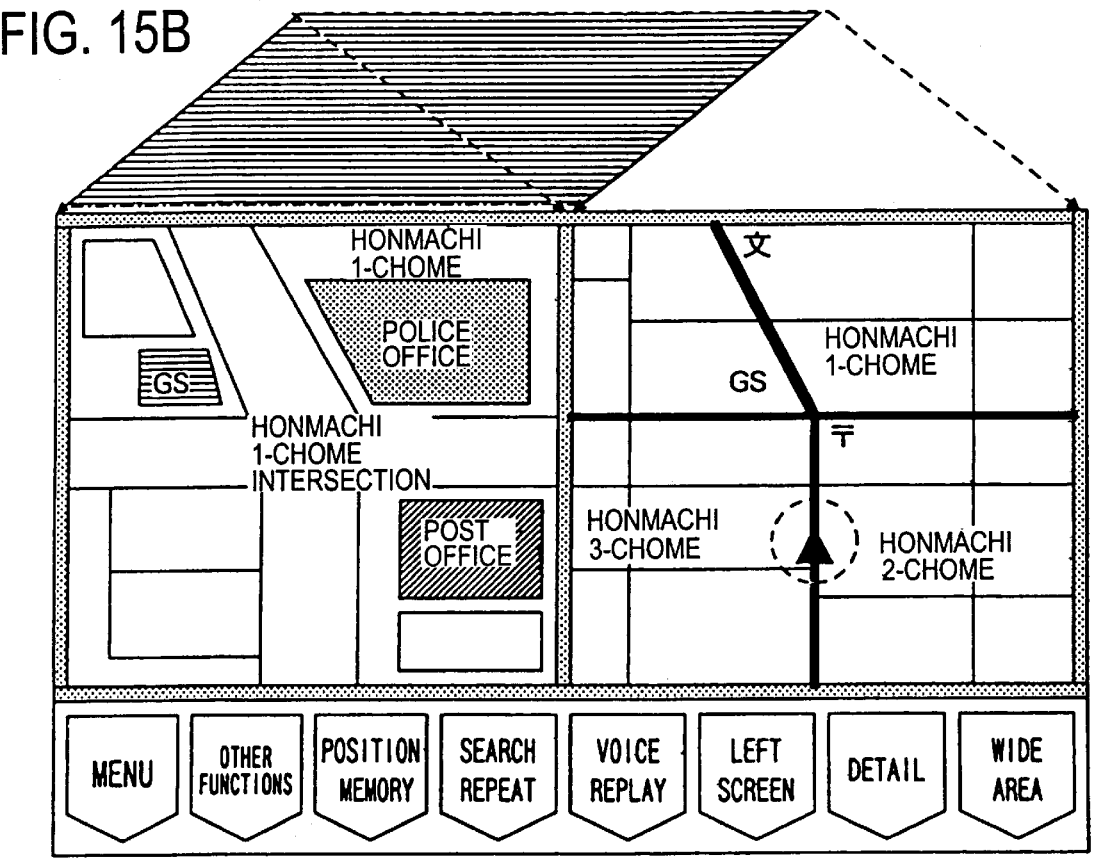

FIGS. 15A and 15B are diagrams describing another example of switching between single screen display mode and two-part split screen display mode.

As shown in FIGS. 15A and 15B, the system may display a present position map screen centering the present position on the one of the screens, i.e. on the right screen, and on the other screen, i.e. on the left screen, building shape map screen including a route map and a city area map and screen relating to the other functions, when switching from single screen display mode displaying present position map screen centering the present position shown in FIG. 15A into two-part split display mode shown in FIG. 15B. By arranging and pressing operational buttons arranged in a horizontal row on the lower part of the screen or hard-buttons under the screen, each operational instruction is input, and the display mode and screen switching are performed as each function is called up.

The following is a description of the functions of each of the buttons illustrated in the drawing. "Return" is an operational button for switching back to the present position map centering the present position or to the original screen in the specified mode when a displayed map is scrolled. "Map direction" is a button for switching between a map that north points up and a map that the travel direction points up. "Display all route" is a button for displaying all of the searched route when the destination is set or route search is complete. "Display diagram" is a button for displaying a diagram which illustrates a 3D travel image during route guidance. While displaying this diagram, this button is replaced by "Diagram reset". "Two-part split screen display" is a button for switching a single screen display into a two-part split screen display. While the two-part split screen is displayed, this button is switched into "two-part split screen reset". "Facility display" is a button for display each facility mark on the corresponding position on the map by designating the specific facilities, such as gas stations, restaurants, fire stations, etc. and while the facilities are displayed, the button is switched into "facility reset". "VICS" is displayed only when the VICS device is connected, and while VICS is displayed, the button is switched into "VICS reset". "Display road selection" is a button for selecting and displaying a highway when the VICS display is on.

In the two-part split display mode, basically the system displays a map centering the present position. The right screen is used as a guidance screen which is switched into a magnified intersection drawing when the vehicle approaches an intersection turn, and the left screen is used as a mutli-purpose screen which displays a building shape map screen for providing supplemental information including a route map and a city area map or displays a screen with the other various purposes. "Menu" which is one of the buttons on the screen shown in the FIG. 15B, is operated to call-up a menu screen. "Other functions" is operated to call-up various other functions. "Memory position" is operated to set and register the locations necessary for inputting the locations, such as a destination, etc., in a memory or call-up said locations. "Search repeat" is operated to search for a different route from the searched route or repeat a route search when the vehicle has deviated from the original route. "Voice replay" is operated to replay the guidance voice, for example, when the driver misses the guidance output while the vehicle is running. "Right screen" is operated to control the right screen, and switches between a detailed display and a wide area display regarding the present position map displayed on the right screen. Therefore, the buttons such as "Return", "Map direction", "Detail", and "Wide-area" are displayed on the screen in this mode. This mode is canceled by pushing "Return". Of course, the map can also be displayed on the left screen, and the driver can call-up the detailed map or the wide area map on the left screen by operating "Detail" or "Wide area" without operating "Right screen".

As shown above, the operable items vary according to the screen display mode. The operation button settings are switched as the occasion demands. Therefore, the buttons shown in the drawing is one example and the button settings are altered as necessary.

Thus, a screen with various functions is displayed in response to the button selection operations in the single screen display mode. When the single screen display mode is switched into a two-part split screen display mode, the system displays the same screen that is displayed on the single screen on the right screen and displays guidance screen, such as the present position map and the magnified intersection map on the left screen. On the left screen, a screen with various functions in response to the button operations, is displayed in the same way as in the single screen display mode. When the screen is switched from the two-part screen display mode into the single screen display mode, the right screen is displayed on the single screen and when the driver requires a display of the guidance screen to be shown on the left screen in the two-part split screen display mode, the system displays, such as the present position map and the magnified intersection map, etc. are operated by the "Return" button.

In two-part split screen display mode, as described above, as the system displays the building shape map screen including the route map and the city area map next to the present position map screen, the driver can obtain useful information with high visibility, such as 3-D travel image information and building shape information, in the vicinity of the present position, etc. which can not be provided by the present position map and the magnified intersection map, etc. Furthermore, for example, the system offers more precise supplemental information by choosing a route map screen when the vehicle is on the highway, or building shape map screen when the vehicle is in the city area, according to the environment of the present position and travel condition.

The invention is not limited to the above mentioned embodiments and various changes can be applied. For example, in the above embodiment, the scrolling operation of the detailed map in the two-part split screen display mode which displays a correspondence of the detailed map and the wide area map, is described. In addition, the driver may scroll the frame on the wide area map. Furthermore, this also can be applied when the detailed map scrolls on the present position detection screen as the vehicle travels.

As clearly stated in the above explanation, when the system displays the detailed map (the magnified map) and the wide area map side by side in two-part split display mode, the system according to the invention displays the area displayed on the detailed map on the wide area map by using a frame, scrolls a frame on the wide area map in correspondence with scrolling operation, and also scrolls the wide area map so that the frame does not step across the wide area map. This allows the driver to keep track of the relationship between the positions on the detailed map and on the wide area map. Regarding the wide area map, scrolling the frame is all that is required to be operated and this can reduce needless processing in scrolling both of the two screens by scroll processing.

What is claimed is:

1. A map display device, comprising:

information memory means for storing map data;

input means for inputting instructions relating to a map display;

display means for displaying a wide-area map and a detailed map respectively display control means for reading map data from said information memory means in response to the instructions input by said input means and controlling map screen displayed on said display means, wherein the display control means moves on the wide-area map with a fixed screen a frame that corresponds to the area of the detailed map in response to scrolling operation of the detailed map on said two-part split screen.

2. The map display device according to claim 1, wherein said display control means scrolls the area displayed on said wide-area map when said frame extends off the screen for displaying said wide-area map, during the scrolling operation.

3. The map display device according to claim 2, wherein said display control means scrolls the area displayed on said wide-area map in order for said frame not to extend off the area displayed on said wide-area map.

4. The map display device according to claim 1, wherein said display control means changes the size of said frame to scale in accordance with the area displayed on said detailed map.

5. The map display device according to claim 1, wherein said display control means comprises a virtual travel mode, and displays a present position mark on said detailed map by using said virtual travel mode, scrolls said detailed map in accordance with a searched route, scrolls the frame displayed on said wide-area map corresponding to said scrolling of the detailed map, and scrolls said wide-area map in order for said frame not to extend off the area displayed on said wide-area map by said scrolling of the frame.

6. A map display device, comprising:

information memory means for storing map data;

input means for inputting instructions relating to a map display;

display means for displaying a wide-area map and a detailed map respectively on a two-part split screen; and display control means for reading map data from said information memory means in response to the instructions input by said input means and controlling map screen displayed on said display means, wherein the detailed map is updated in response to the operation of moving a frame on a wide-area map with a fixed screen on said two-part split screen.

7. A computer readable recording medium storing a map display program displays a wide-area map and a detailed map on a two-part split screen and moves on the wide-area map with a fixed screen a frame that corresponds to the area of the detailed map in response to scrolling operation of the detailed map.

8. A computer readable recording medium storing a map display program displays a wide-area map and a detailed map on a two-part split screen and updates the detailed map in response to moving a frame on the wide-area map with a fixed screen.

* * * * *